(No Model.) 3 Sheets—Sheet 1.
F. R. WHITE.
CLUTCH.
No. 489,279. Patented Jan. 3, 1893.
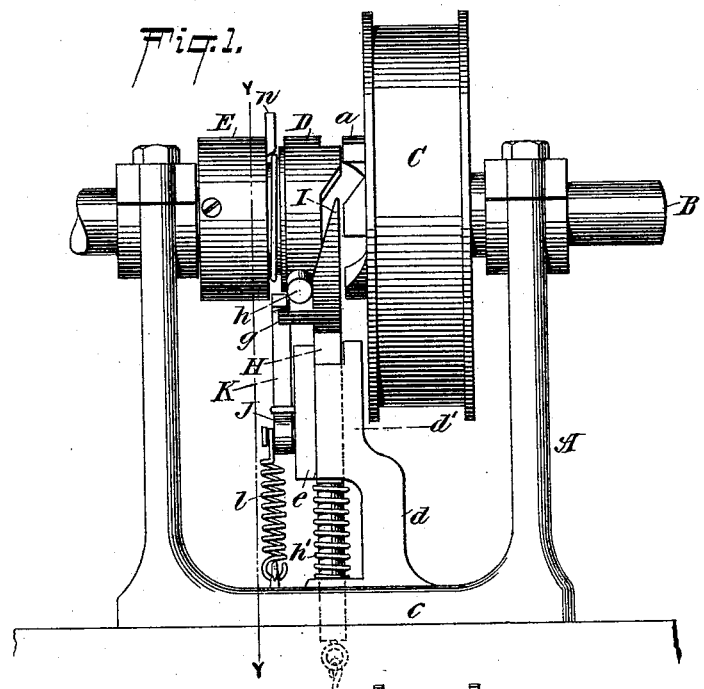
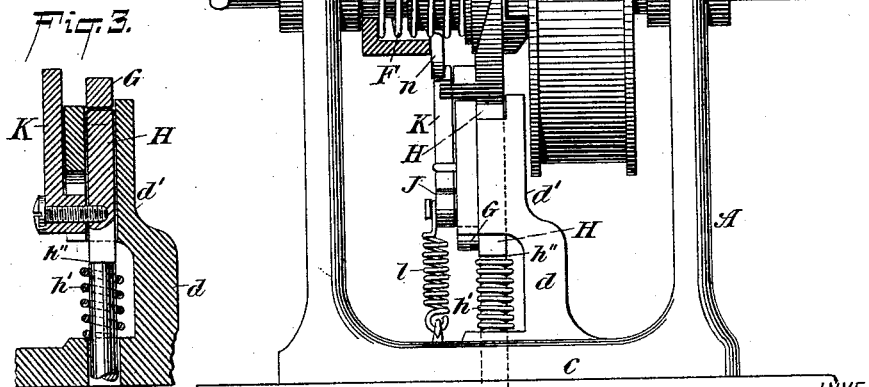
WITNESSES:
William Goebel.
Richard Lips.
INVENTOR
Franklin R. White
BY George Cook.
ATTORNEY.

(No Model.) 3 Sheets—Sheet 2.
F. R. WHITE.
CLUTCH.
No. 489,279. Patented Jan. 3, 1893.
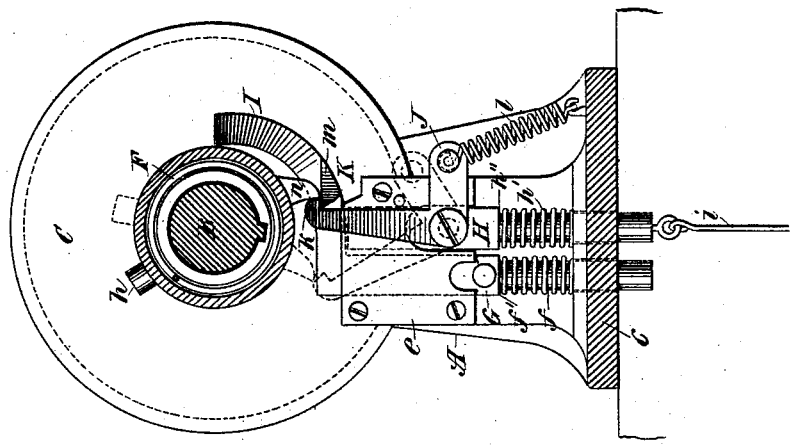
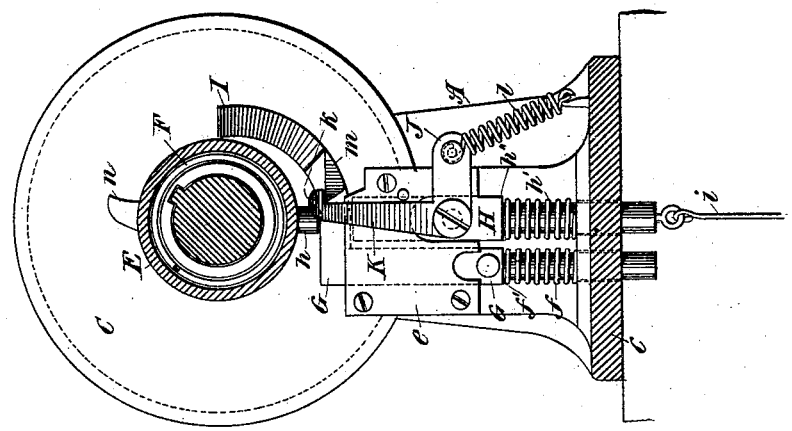
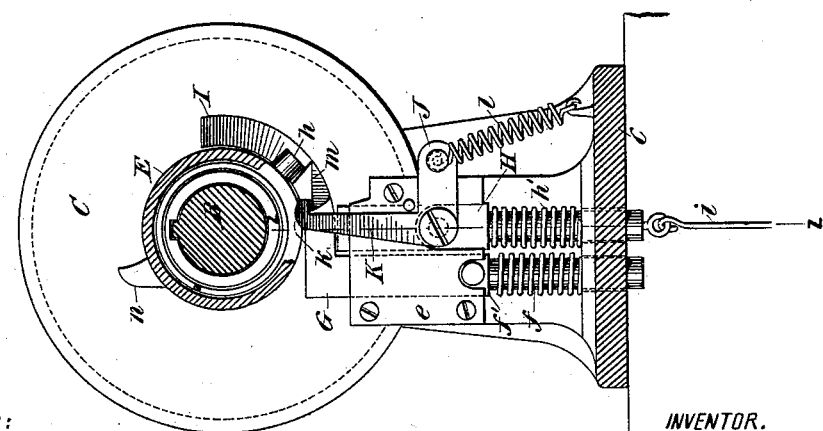
WITNESSES: William Goebel, Richard Lips
INVENTOR. Franklin R. White
BY George Cook.
ATTORNEY.

(No Model.)　　　　　　F. R. WHITE.　　3 Sheets—Sheet 3.
CLUTCH.

No. 489,279.　　　　　　　　Patented Jan. 3, 1893.

WITNESSES:
William Goebel.
Richard Lips.

INVENTOR
Franklin R. White
BY George Cook.
ATTORNEY.

THE NORRIS PETERS CO., PHOTO-LITHO., WASHINGTON, D. C.

UNITED STATES PATENT OFFICE.

FRANKLIN R. WHITE, OF WATERBURY, CONNECTICUT.

CLUTCH.

SPECIFICATION forming part of Letters Patent No. 489,279, dated January 3, 1893.

Application filed February 1, 1892. Serial No. 419,946. (No model.)

*To all whom it may concern:*

Be it known that I, FRANKLIN R. WHITE, a citizen of the United States, and a resident of Waterbury, in the county of New Haven and State of Connecticut, have invented certain new and useful Improvements in Clutches, of which the following is a specification.

My invention relates to an improvement in clutches, the object of the same being to so construct a device of this character that the shaft to which the clutch is attached will make but one revolution, and then remain stationary until the lever has been again manipulated by the operator.

With these ends in view, my invention consists of certain novel features of construction and combination of parts, as will be hereinafter fully described and pointed out in the claims.

Figure 7:
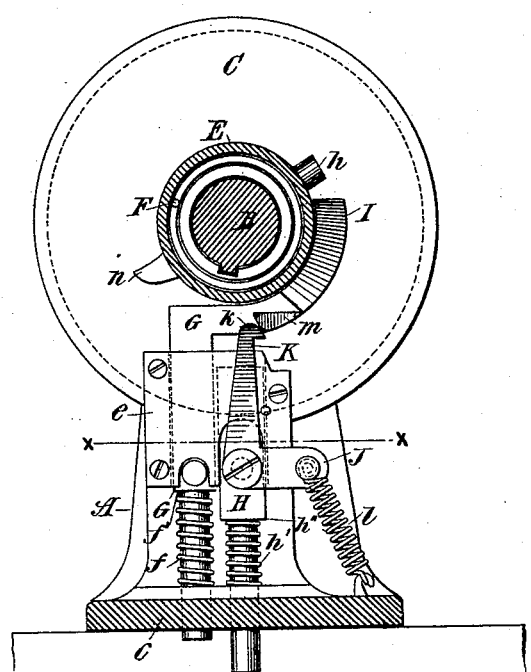
Figure 8:
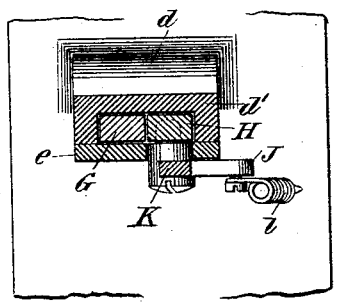

In the accompanying drawings Figure 1 is a view in front elevation of my improved clutch. Fig. 2 is a similar view showing the parts in position to allow the shaft to rotate. Fig. 3 is a sectional view taken through the line $z-z$ of Fig. 4. Figs. 4, 5, 6 and 7 are sectional views showing the several parts in their different adjustments while the shaft is revolving, and taken on line $y-y$ of Fig. 1. Fig. 8 is a sectional view taken on the line $x-x$ of Fig. 7.

A represents a frame or support provided with bearings in which is mounted the shaft B, the latter having loosely mounted thereon the pulley C, the inner side of which has formed thereon the teeth $a$, adapted to engage with the teeth $b$, formed on the edge of the collar D, which latter is mounted on the shaft B, being keyed thereto to revolve with said shaft, and at the same time allowed to slide thereon in a direction either toward or away from the pulley C, to engage therewith or become disengaged therefrom. To the shaft B is also tightly secured the sleeve E, adapted to contain one end of a spring F, the opposite end of the latter bearing against the collar D, and the tendency of which spring is to keep the said collar D in engagement with the teeth $a$, on the pulley C.

On the base or bed plate $c$ of the frame is formed or secured the vertical arm or support $d$, the upper portion $d'$ thereof being cut out as shown in Fig. 8 to contain the vertical movable rods G and H, a face plate $e$, being secured thereto to hold the rods in place.

The upper end of this sliding rod G has formed thereon the cam I, curved as shown in the several figures of the drawings to partially encircle the collar D, and provided with the lateral lug or projection $g$, against which strikes the lug or projection $h$, formed on the collar D, at the end of every revolution of the latter for the purpose of disengaging it from the pulley C as hereinafter described.

The upper portion of the sliding rod H or that portion contained within the bearing $d'$ is preferably made square to prevent it from turning, while the lower portion is rounded and encircled by a spring $f$, the upper end of which bears against the shoulder $f'$, formed on the rod, while the lower end bears against the base or bed plate $c$, the lower end of the rod being allowed to extend through an opening formed in said bed plate for that purpose. The upper portion of the sliding rod H is also made square to prevent its turning in its bearing $d'$ the lower end thereof being rounded and encircled by the spring $h'$, the upper end bearing against the shoulder $h''$ formed on the rod, and the lower end bearing on the bed plate $c$, the extreme end of the rod extending through said bed plate and connected by a wire $i$, to a treadle (not shown) the tendency of the spring $h'$ being to keep the rod H in its raised position.

To the rod H is pivoted the bell crank J, the vertical arm K of which is provided on its extreme end with the catch or shoulder $k$, the free end of the other arm having secured thereto one end of a spring $l$, the opposite end of the latter being connected to the bed plate $c$. The tendency of this spring is to keep the horizontal arm of the bell crank down, and the catch $k$ in engagement with the shoulder $m$ formed on the cam I by slightly cutting away a portion of the projection $g$ as shown in Figs. 4, 5 and 6. From this description it will be understood that when the rod H is lowered by the operator, the bell crank J pivoted thereto is also lowered, which by means of the catch $k$, also lowers the cam I and cam rod G, whereupon the spring F immediately forces the collar D into engagement with the pulley C which is constantly revolved by being belted to a pulley on the shafting in the ordinary manner, the lug $h$ bearing on the upper surface of the cam I, as shown in Fig. 5. If the operator keeps the rod H lowered by keeping his foot on the treadle, the shaft B revolves until a lug $n$ formed on or secured to the disk E strikes the catch $k$ on the bell crank, as shown in Fig. 6, and throws it backward as shown in dotted lines. The cam and rod being then released, the spring $f$ raises them to their normal position as shown in Fig. 7. The shaft continuing the revolution, the lug $h$ on the collar D, strikes the cam I, and moving against the same strikes the shoulder or projection $g$ thereon and brings the shaft to a stop, having withdrawn the collar D from engagement with the pulley. By withdrawing the pressure of the foot from the treadle, the spring $h'$ raises the rod G and bell crank J until the catch $k$ again engages with the shoulder $m$ on the cam, when the operation can again be repeated.

In order to prevent the horizontal arm of the bell crank from being lowered too far when the parts are in a position as shown in Fig. 7, a pin or lug is formed on the face plate $e$, against which the vertical arm strikes. If after the rod H is lowered and the collar D allowed to engage with the teeth $a$, on the pulley C, the operator releases the said rod, the springs $f$, $h'$ will raise the rods G, H, immediately after the lug $h$ rides over the end of the cam I, and as the sleeve E revolves, the lug $n$ thereon will strike on the shoulder $m$ lowering the cam I and disengaging the bell crank from the said shoulder $m$, as shown in dotted lines Fig. 6, the said cam immediately rising again by reason of the action of the spring $f$, and the bell crank also rising and engaging the shoulder $m$ by reason of the action of the spring $h'$. As the shaft and its attachments continue the revolution, the lug $h$ strikes the cam I and riding against it withdraws the collar D from engagement with the teeth $a$ and by striking against the shoulder $g$, brings the shaft to rest at the end of the revolution, the several parts thus assuming their normal or original positions, as before described.

Having fully described my invention, what I claim as new and desire to secure by Letters Patent, is:—

1. In a clutch mechanism the combination with a clutch, of a vertically moving cam adapted to engage and disengage the two sections of the said clutch, a lever adapted to engage the cam and lower the same, and a lug attached indirectly to and revolving with the shaft to disengage the said lever from the cam at each revolution of said shaft, substantially as and for the purposes described.

2. In a clutch mechanism the combination with a shaft having a clutch secured thereon, of a vertically moving cam, a lever for engaging and lowering the cam, a lug attached indirectly to and revolving with the shaft for disengaging the said lever from the cam at each revolution of the shaft, and a spring for raising said cam, when so released, substantially as described.

3. In a clutch mechanism, the combination with a shaft and a clutch secured thereon, of a movable cam, a vertically movable bell crank adapted to engage and lower said cam, a lug secured indirectly to and revolving with the shaft adapted to strike and disengage said bell crank from the cam at each revolution of the shaft, and springs for raising said cam and bell crank when disengaged, substantially as described.

4. A clutch constructed with a cam, a bell crank to lower the same, means for disengaging the bell crank from the cam at each revolution of the shaft, and a spring for raising the cam when released from said bell crank, substantially as described.

5. In a clutch the combination with the cam I, constructed with the spring actuated rod G, of the spring actuated rod H, spring actuated bell crank J, sleeve E, and lug $n$, the several parts being arranged to operate in the manner and for the purpose substantially as set forth.

6. In a clutch, the combination with a cam I, constructed with the shoulders $g$, $m$ of the lever H, bell crank J, formed with the catch $k$, to engage said shoulder $m$, and springs $l$, $h'$, all arranged to operate in the manner and for the purpose substantially as set forth.

7. In a clutch, the combination with the shaft, of the pulley C, formed with the teeth $a$, the spring actuated collar D, formed with the lug $h$, sleeve E, formed with the lug, $n$, cam, I, spring actuated rods G, H and lever J, the several parts being constructed and arranged to operate in the manner and for the purpose substantially as set forth.

Signed at Waterbury, in the county of New Haven and State of Connecticut, this 20th day of January, A. D. 1892.

FRANKLIN R. WHITE.

Witnesses:
IRVING G. PLATT,
JAMES E. RUSSELL.